Nov. 13, 1956 F. KESSELRING 2,770,766
MAGNETIC RECTIFIER

Filed June 27, 1952 5 Sheets-Sheet 1

*FIG_1_*

INVENTOR.
*Fritz Kesselring*
BY *Ostrolenk + Faber*

ATTORNEYS

Nov. 13, 1956

F. KESSELRING 2,770,766

MAGNETIC RECTIFIER

Filed June 27, 1952

INVENTOR.
FRITZ KESSELRING
BY Oxholm & Faber
ATTORNEYS

Nov. 13, 1956 F. KESSELRING 2,770,766
MAGNETIC RECTIFIER
Filed June 27, 1952 5 Sheets-Sheet 3

INVENTOR.
FRITZ KESSELRING
BY
ATTORNEYS

Nov. 13, 1956 F. KESSELRING 2,770,766
MAGNETIC RECTIFIER
Filed June 27, 1952 5 Sheets-Sheet 4

FIG. 6.

INVENTOR.
FRITZ KESSELRING
BY
ATTORNEYS.

Nov. 13, 1956    F. KESSELRING    2,770,766
MAGNETIC RECTIFIER
Filed June 27, 1952    5 Sheets-Sheet 5

INVENTOR.
FRITZ KESSELRING
BY
ATTORNEYS

United States Patent Office 2,770,766
Patented Nov. 13, 1956

2,770,766

MAGNETIC RECTIFIER

Fritz Kesselring, Zollikon, Zurich, Switzerland, assignor to FKG Fritz Kesselring Geratebau A. G., Bachtobel-Weinfelden, Thurgau, Switzerland, a corporation of Switzerland Application June 27, 1952, Serial No. 296,011

6 Claims. (Cl. 321—48)

My invention relates to magnetic rectifiers and is more particularly directed to a magnetic rectifier having an impulse winding and is further directed to a novel magnetic rectifier enclosed in a gas tight housing.

An electromagnetitc rectifier basically consists of a relay like structure having a winding connected to the main electrifying circuit. This relay winding energizes the electromagnet when current flows from the main source to cause this armature to be attracted. Upon attraction of the armature, the current from the source flows through the winding and across contacts bridged by the armature to a load source.

The relay winding of this construction is so arranged in a circuit that current only in one direction will flow from it so that the output circuit is rectified D. C. current.

Inasmuch as relays of this construction depend upon current flow in the electromagnetic winding for energizing the armature, difficulties have been encountered heretofore when the load current has been so small that the amount of current flowing through the winding has been insufficient to energize the electromagnet.

In the prior art, considerable difficulty was encountered when the magnitude of load current through the main energizing coil was not sufficient to attract the bridging armature of the rectifier. That is, frequently the load current was of such a small value that the magnetic attraction due to the ampere turns of the relay windings was insufficient to overcome the force of the bridging contact spring and hence, considerable damage would result to the bridging diode or rectifier.

My novel rectifier proposes the use of an impulse winding which will be effective only during the period of switching operation to aid and insure armature attraction at the beginning of the rectifying cycle and also to set up an opposite flux to aid and insure armature release at the end of the rectifying cycle.

The impulse winding of my novel magnetic rectifier may be used in coordination with a permanent magnet in such a manner that the magnetic flux created by the impulse winding will aid the permanent magnet during the closing operation at the start of the rectifying cycle and oppose the fault of the permanent magnet at the end of the rectifying cycle.

Another embodiment of my invention eliminates the necessity of a separate energizing coil by providing a construction in which the main power line passes through the magnetic structure in such a manner as to create a single turn winding to be effective as an operating winding to attract the bridging armature during switching operation.

In the operations of electromagnetic rectifiers, as described in the above, the armature must be operated to its front and back stops 120 times a second. The use of a biasing spring to withdraw the armature upon deenergization may not under some circumstances, be fast enough particularly since the actual interval during which the change from contact engagement to contact disengagement of the rectifier is only a very small fraction of the $\frac{1}{120}$ of a second during which the armature is in either energized or de-energized position. Accordingly, the construction of such springs has presented a severe problem.

In accordance with another feature of my invention, I propose to replace the spring by a second electromagnet and magnetic structure so arranged that it does not interfere with the normal operation of the armature in response to the first electromagnetic circuit and does function at the instant current reaches zero to pull the armature to its open or de-enerized position.

As stated above, the armature contact is required to close and open a circuit 120 times a second. The instant of closing must occur at that infinitely small fraction of $\frac{1}{120}$ fraction of a second when the current goes to zero and is increasing in the correct direction.

Correspondingly, the instant of opening must occur in that infinitely small fraction of $\frac{1}{120}$ fraction of a second when the current is again decreasing to zero and is about to reverse.

In the latter of these two mentioned instances, that is the instant when the contacts are to separate, it is impossible in practice to actually effect interruption at exactly the instant that current goes to zero. There is, accordingly, a tendency for the contacts to arc. It would require only a minute amount of arcing at the contacts to, in a very short time, cause arcing corrosion at the contact since such a minute arc is repeated 120 times in one second and 60 times 120 in one minute.

In view of this problem, not only is it important to preperly design and construct the electromagnetic system, the armature and the circuitry, but also to so arrange the elements that the movable contacts are housed in a gas filled chamber or an evacuating chamber where arcing tendencies can further be decreased.

Heretofore, however, in attempting to construct the armature and its contacts within such a chamber, difficulties have been incurred due to the problem of bringing the magnetic circuit into and out of the chamber and still retain the required sealing. Because of the size of the magnetic system, it has been proposed to interrupt the magnetic system on the outer wall of the chamber and continue it from the inner wall but this introduces a further gap in the magnetic circuit and thereby decreases the efficiency of the switching operation.

In accordance with another feature of my invention, I house in a sealed chamber all of the electromagnetic circuits of my electromagnetic rectifier and bring out only the electrical leads in a sealed manner well known now in the art in connection with the vacuum and other corresponding devices.

This embodiment proposes the use of an electromagnetic coil which will be operative to withdraw the bridging armature during the non-conducting half cycle of the electromagnetic rectifier. Two modifications are set forth to accomplish the biasing of the bridging armature without the necessity of a spring means. In the first embodiment, the biasing coil is energized with a D. C. current and has a magnetic attracting force which is considerably less than the magnetic attracting force resulting from the control and impulse winding to attract the armature to bridging position. Thus, during the non-conducting cycle, the impulse control windings are de-energized, the only magnetic force upon the bridging armature will be due to the biasing winding and thus, the contact armature will be removed from and held in disengaged position.

In the second modification, which negates the necessity of a biasing spring, the armature biasing winding is connected in a control circuit so that it receives energizing current only during the non-conducting half cycle. Thus, as the contact cycle of rectification commences, there will be no magnetic force from the biasing winding to hold the armature in disengaged position and hence, the entire magnetic force emanating from the impulse and control winding will be effective to attract the bridging contact armature into engaged position.

In another embodiment of my invention, I provide the control relay with a plurality of armatures in order to provide a parallel path for the main current.

In this embodiment, a first main armature is attracted to the engaged position by means of the magnetic force resulting from the impulse and control winding.

A second armature, which is associated with a second magnetic circuit independent of the magnetic circuit energized by the impulse winding, is subsequently attracted by the magnetic force due to the single turn control winding to thereby provide a parallel electrical circuit for the load current.

Accordingly, an object of my invention is to provide an electromagnetic rectifier utilizing an impulse winding to aid the control winding to insure armature attraction and release.

Another object of my invention is to provide an impulse winding for an electromagnetic rectifier used in coordination with a permanent magnet whereby armature attraction and release is achieved in a positive manner.

A still further object of my invention is to provide an electromagnetic rectifier which is capable of operation independently of the magnitude of load current.

Another object of my invention is to provide a magnetic rectifier in which arcing at the bridging contacts is substantially eliminated.

Another object of my invention is to provide an electromagnetic rectifier in which material contact errosion and pitting is eliminated without the necessity of an auxiliary electrical circuit.

Still another object of my invention is to provide an electromagnetic rectifier which is used in a gas filled container in such a manner that there is no undue increase in the reluctance of the magnetic path.

A still further object of my invention is to provide an electromagnetic relay enclosed in a gas filled housing whereby the elimination of the magnetic structure does not cause leakage of the gas therefrom.

A still further object of my invention is to provide a rectifier completely enclosed in a gas filled housing whereby arcing at the bridging contacts will be eliminated.

Another object of my invention is to provide a rectifier which eliminates the necessity of a biasing spring for the bridging armature.

A further object of my invention is to provide an electromagnetic rectifier with a biasing coil for the bridging contact armature to set up a magnetic attracting force to remove the bridging armature from engaged position.

Still another object of my invention is to provide a biasing coil for rectifier which is effective only during non-conducting half cycle of rectification.

A further object of my invention is to provide an electromagnetic relay structure which eliminates the necessity of a separate and independent control winding.

Another object of my invention is to provide a structure arrangement whereby the main power leads provide a single turn through the magnetic path of the switching relay to effect armature engagement and disengagement.

Still another object of my invention is to provide a structure arrangement for a plurality of parallel electrical paths for the load current.

Another object of my invention is to provide an electromagnetic relay with a plurality of armatures to reduce the magnitude of load current flowing through each.

These and other objects of my invention will be apparent from the following description and figures in which.

Figure 1:
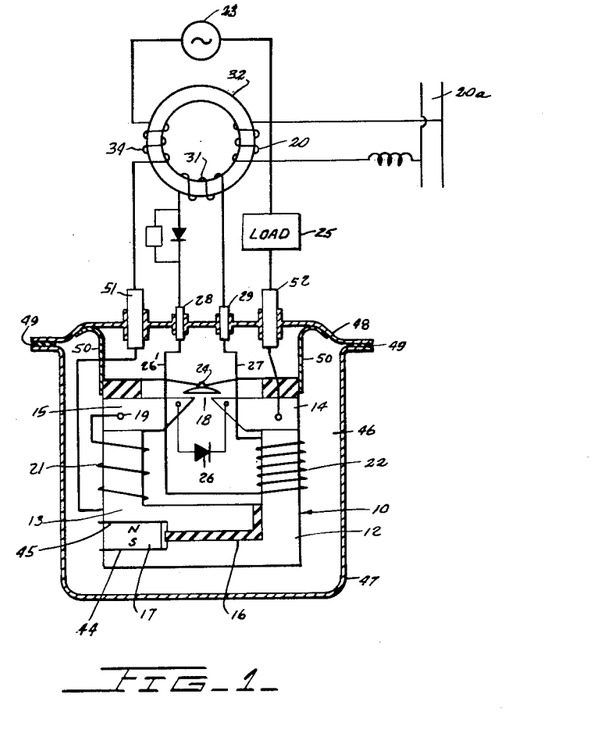
Figure 1 is a side view of the switching relay and the associated circuitry therefor enclosed in a gas tight housing.

Referring to Figure 1, I have shown a magnetic structure 10 of laminated iron. The laminated structure 10 comprises angular members 12 and 13 and the pole pieces 14 and 15 secured to the angular pieces 12 and 13 in any well known manner. The angular sections 12 and 13 are spaced from each other by any suitable means such as the insulation member 16. Thus, the normal magnetic path is provided from the pole piece 15 across the airgap adjacent thereto to pole piece 14 through the magnetic structure 12 and across the gap at 16 back to the magnetic structure 13.

In parallel with this latter gap, there is a permanent magnet 17 having the respective north and south pole as indicated in the drawing and providing a magnetic path which shunts the gap 16 as will now be obvious. As will appear hereinafter, the permanent magnet 17 provides a source for electromagnetic lines of force which will hold the armature of the electromagnet in operative position once energization has previously been achieved and under other circumstances, as will appear hereinafter, electromagnetic forces of the permanent magnet are neutralized to permit release of the armature.

The electromagnetic circuit 10 is energized by two windings 21 and a pulsing winding 22. The main winding 21 is connected in series with a source of alternating current 23 and through the magnetic circuit at 24 and pole pieces 15 and 14 and the armature 24 back to the load 25.

The above described circuit is achieved only after the relay winding 21 has been energized sufficiently to pull the armature 24 to the position in which it bridges the gap formed by the pole pieces 14 and 15. Before such bridging occurs, however, a circuit is completed for the winding 21 across the rectifier 26 which bridges the gap 18 and provides a path for current in a predetermined direction.

When the amplitude of the current in the winding 21 is sufficient to operate the armature 24, the above described circuit which bypasses the rectifier 26 will be completed.

Figure 7:
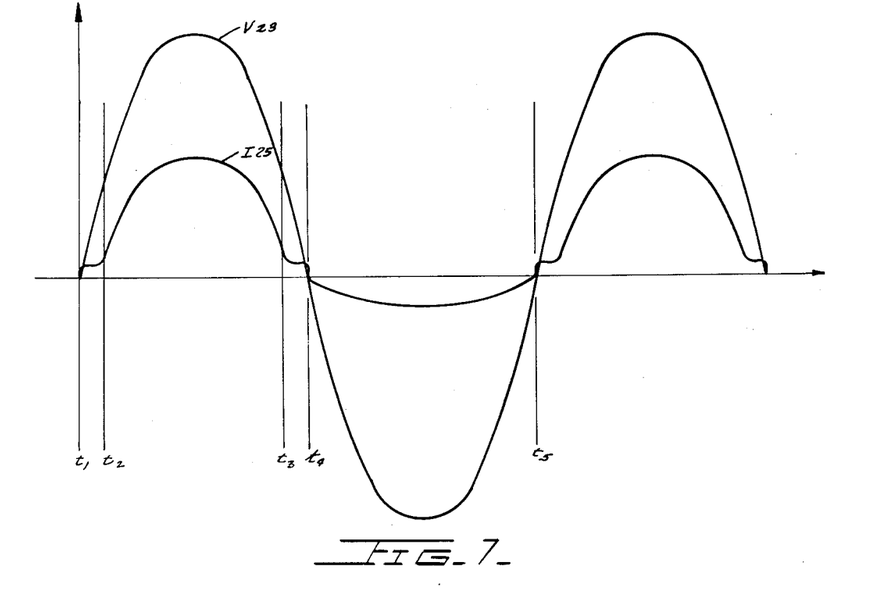
Figure 7 is a diagram illustrating the time relationship between the source of voltage, the load current and the impulse voltage.

In Figure 7, voltage wave $V_{23}$ indicates the output voltage from the alternating current source 23 and $I_{25}$ illustrates the current which will flow due to the load 25. Assuming that the rectifier 26 permits current in the positive direction to flow, then the winding 21 will be energized when the value of the current $I_{25}$ in the positive direction reaches a predetermined value which in the present case is assumed to be at the value A.

From the above description, it will be noted that the operation of the electromagnet automatically synchronizes with the signal pulses. That is to say, an electromagnet 21 which is energized by the positive pulse to operate the armature 24 into engagement with the pole pieces which bridges the gap formed thereat, then there is no danger here of a non-synchronous operation. That is to say, an operation in which the armature will close the gap during the wrong half cycle. This is a decided advantage in the electromagnetic type of rectifier. On the other hand, the electromagnetic type rectifier does depend upon sufficient current flowing through the operating winding 21 to achieve operation of the armature 24 into engagement with the contacts to be bridged.

Inasmuch as the current flowing through the winding 21 varies with the load, in these instances where the load current is extremely small, there may not be sufficient current flowing through the operating winding to achieve operation of the armature. In order to overcome this difficulty, I have provided a second winding 22 which I call a pulsing winding.

The winding 22 is connected over the conductors 26 and 27 and through the lead-in sealing devices 28 and 29 to the secondary winding 31 on the saturable core reactor 32.

As will be described in more detail hereinafter, at the beginning of each cycle at which the switching or stepping operation is to occur, I arrange to transmit energizing poles through the winding 22 of a momentary nature sufficient to attract the armature 24 into its contact engaging position. This is achieved by the novel construction of the saturable core reactor 32, which is constructed in accordance with the description provided in the Diebold application Ser. No. 257,901, filed November 23, 1951, and is provided with a first winding 34 connected between the source 23 and the operating winding 21.

Figure 8:
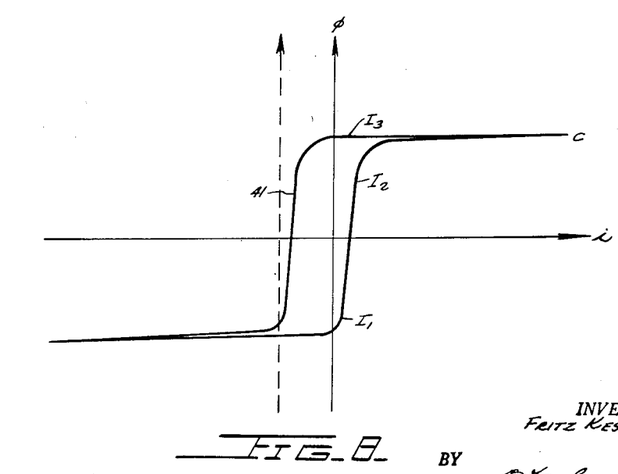
Figure 8 is a dynamic flux current curve of a saturable core reactor use in my invention.

Figure 8 illustrated the dynamic flux current curve for the reactor 32. With no biasing means, the axis for this curve will be as indicated at the right vertical line of Figure 7. However, since it becomes necessary and desirable to have the reactor 32 saturate and desaturate while the load current is passing from the positive half cycle of operation, it becomes necessary to provide a biasing winding for the reactor. Hence, an auxiliary biasing winding 10 is provided for the core of reactor 32 and energized by the source 20a. The net effect of this winding will be to pre-energize the core and will move the vertical flux axis of Figure 8 to the left as indicated by the dotted line. This feature is set forth with more particularity in the application of Diebold, Ser. No. 257,398, filed November 20, 1951.

Due to the novel construction of this reactor 32, the winding 34 has a high impedance value at the beginning of the operating cycle at the instant when the stepping or switching is to occur. Accordingly, substantially all of the voltage from the source 23 will appear across the windings 34 and very little or substantially none will be left for the load 25.

The high impedance of the circuit will prevent any substantial current value during this stepping operation and accordingly at the instant when the armature 24 is moving to contact engagement, the arcing tendency will be reduced to a minimum.

Figure 6:
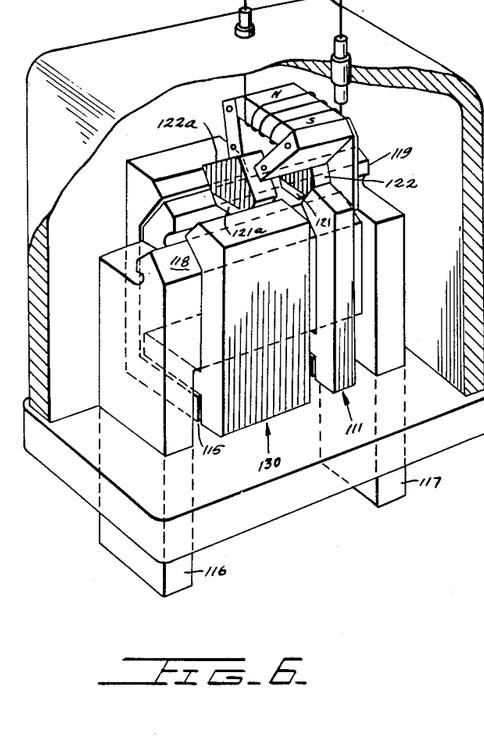
Figure 6 is a cut away perspective view of the rectifier of Figures 4 and 5 showing the auxiliary biasing magnetic structure and the single turn control winding.

As shown in Figures 6 and 7, during the interval T1 to T2 and while the current has increased from the value I₁ to I₂, the flux has changed at a high rate. This rapid change in flux or $$\frac{dI}{dt}$$

which is the cause of the high impedance of the winding 34 during this interval will induce in the secondary winding 31 the voltage pulse of relatively high intensity. This high voltage pulse induced in the winding 31 will produce a current flow over its circuit including the winding 22 to momentarily energize the winding 22 at the beginning of the cycle. The winding 22 thus energized will operate the armature 24 against its contact to complete the circuit for the winding 31 independent of the rectifier 26.

Thus, in accordance with this construction, operation of the armature 24 is achieved independently of load currents at a time in the current cycle which has heretofore been impossible.

As soon as the armature 24 has closed its front contact, the voltage across the rectifier 26 goes to substantially zero. That is, the only voltage across the rectifier is now the RI drop of the contacts. Accordingly, substantially all of the current will flow over the contacts bridged by armature 24.

The instant the armature 24 has moved to its front contact, the electromagnetic circuit from the permanent magnet 4 and the pole pieces 14 and 15 and armature 24 is sufficient to maintain the armature against its contacts even at the end of the momentary pulse current from the winding 22.

Thus, the armature is now held in contact engaged by the permanent magnet 17. In addition, load current flowing through the winding 21 will now vary the contact pressure in accordance with the load, a condition highly desirable.

When the load currents are large, the current flowing through the winding 21 will be relatively large and greater contact pressure will be achieved by the contact bridged by armature 24. When the currents are lower, the contact pressure will be correspondingly lower due to the lesser current flowing through the winding 21. As the current during the decaying portion of the cycle reaches the value at interval T3 which corresponds to a current value I₃ in Figure 7, the saturable core reactor which during this operation of the cycle was of substantial impedance list device due to the fact that there was no flux change now again experiences a rapid change in the value of the flux. In this instance, however, as compared with the previous description, the flux is decayed over the curve portion 41.

The rate of change of flux in the opposite direction from the interval T3 and T4 will now induce voltage in the secondary winding 31 in the opposite direction from that previously. At the beginning of the cycle, the momentary current flowing through the winding 22 during this interval will set up a flux having an opposite direction from that previously described. In the previous case, the flux was in a direction which assisted the flux generated by the permanent magnet 17.

The flux now flowing has a direction opposite to that of the flux produced by permanent magnet 17 and accordingly, neutralizes the latter. The electromagnet is thereupon de-energized and the armature 24 is now drawn to its open position over the action of its springs 42. Springs 42 on which the armature is mounted are of a construction described in my previous application Ser. No. 87,212 filed April 13, 1949, now Patent No. 2,617,974.

In the above description, the circuit for the electromagnet 21 was described as including the electromagnetic path in order to insure against any possible bypass through the electromagnetic circuit which would avoid the armature and its contacts.

A break in the electromagnetic circuit is provided by means of the insulation 16 and also by mounting the permanent magnet 17 in the portions of contact in the electromagnetic circuit.

Despite all the precautions that are taken to prevent arcing at the contacts during the switching operations, the extremely high number of engagements and disengagements that occur, there being 120 makes and breaks per second, make it necessary to provide further protection against arcing.

In my main Patent No. 264,433 and in my supplemental patent application 58,792, both filed in Switzerland, a structural arrangement is set forth whereby the switching means is placed in a gas proof housing to eliminate sparking at the airgap during contact disengagement.

In the above identified patent application, only the poleshoes 14 and 15 and associated contact armature 24 were housed in the gas tight enclosure.

This arrangement could take the form of one of two embodiments. In the first embodiment, the housing was built around the poleshoes 14 and 15 and sealed. However, due to the laminations of the magnetic pieces 14 and 15, a leakage path resulted and hence, it was not possible to maintain a gas tight arrangement. In the second embodiment, which was designed to overcome the inherent leakage due to the laminated pole pieces, the housing was built through the pole pieces 14 and 15. That is, an airgap was cut in each of the polepieces to enable the housing to pass therethrough. However, even though the gas leakage which previously occurred due to the laminated polepieces could be eliminated in this manner.

The two additional airgaps of the polepieces resulted in an undue increase in the reluctance of the magnetic system 10. In the embodiment of my present gas tight enclosure, both of the above noted difficulties have been overcome.

In accordance with the patent invention, I achieve this by mounting the armature 24 and its contacts to be bridged in a gas chamber 46.

The chamber 46, which contains any suitable gas which prevents arcing, is formed by the container 47 of any suitable metal having a cap or closure 48. The closure 48 is sealed to the container 47 by suitable gasket 49 which prevents any leakage thereat.

Secured as by welding to the closure 48 is a tubular member 50 of any suitable construction to which is secured the magnetic system 10 including its winding and the armature.

The conductors are brought out of the container through the sealed lead-ins 28—29 51—52 which provide gaseous sealing in a manner which is now well known of the vacuum tube art.

It will be noted that in accordance with my present construction, the only member which requires connection outside of the container are conductors which can be readily sealed in accordance with the art now well developed.

The electromagnetic system and other parts are now contained within the sealed enclosure.

Figure 2:
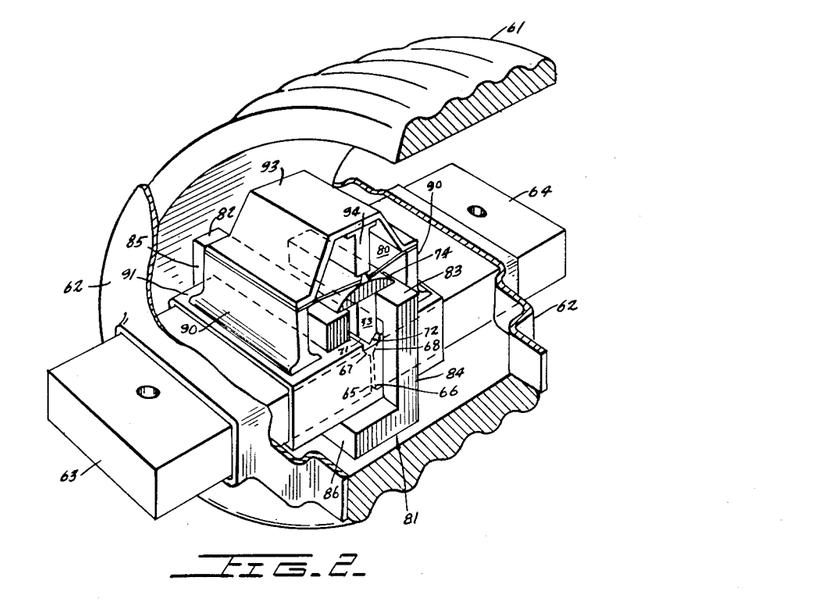
Figure 2 is a cut away perspective view of another embodiment of my invention illustrating the use of power leads as a single turn control winding.
Figure 3:
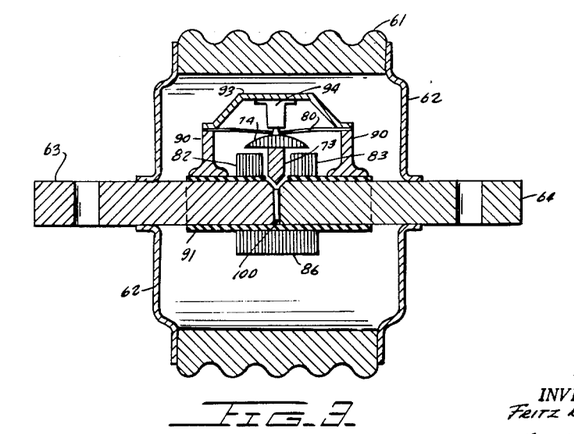
Figure 3 is a cross-section view of Figure 2 showing the construction of the bridging contact armature and single twin control winding.

In Figures 2 and 3, I have shown the detailed embodiment of one form of my invention. In electromagnetic rectifiers heretofore produced, the electromagnetic circuit of the electromagnet function both as a path for the flux and also as a path for the current, whereby power of the system in which the electromagnet is to operate is of a substantially large value. I have found that I can secure sufficient magnetizing action by the use of a single turn. In such a case, the magnetic circuit functions solely to conduct the magnetic line of force and does not carry any other current, such as construction is illustrated in Figures 2 and 3. As there shown, the sealed enclosure 61 is provided with a bracket 62 at each end thereof.

The bracket 62 is provided with an opening through which the conductors 63 and 64 are admitted into the enclosure. At the entrance of conductors 63 and 64, suitable sealing means are provided to prevent leakage thereat. Conductors 63 and 64 terminate at 65 and 66 providing a gap therebetween.

The upper section of conductors 63 and 64 at their terminus 65 and 66 are wedge-shaped as illustrated at 67 and 68 to form contact surfaces to be engaged by the contact surfaces 71 and 72 of the contact conducting member 73 when the leg is moved into contact engagement.

The armature conducting member 73 is mounted on and carried by the armature 74 which is normally biased to contact disengagement position by the springs 80 in a manner now well-known in this art.

The electromagnetic system for this electromagnet comprises overlapping electromagnetic paths 82 and 83.

The electromagnetic system 81 comprises a leg 82, 83 having an integral extension 84 and 85 connected by base section 86. From the leg portion 84 extends the opposite end of the electromagnetic system 82 which overlaps the first mentioned section 83.

When the armature 74 is energized to contact engagement the contact portions 71 and 72 bridge the conductors 63 and 64 at their contact surfaces 67 and 68 and simultaneously the end surface of the armature bridges the pole pieces of the electromagnetic surfaces 82 and 83.

The armature structure is supported on bracket legs 90—90 which support the biasing spring 80. An insulating tube 91 is sandwiched between support brackets 90 and the main conductors 63 and 64.

The housing 93 is supported on the brackets 90 and supports stop member 94. Stop member 94 is positioned immediately above the armature 74 to limit its upward movement.

Inserted in the gap formed between the conductors 63 and 64 is a rectifier 100 of any well known construction which connects conductors 63 and 64.

Although no pulsing winding such as illustrated in Figure 1 at 22 is here shown, it will be obvious that I may employ such pulsing circuit in combination with this construction.

The current flowing through the main conductor 63 and 64, however, will energize the electromagnetic circuit to generate flux therein, sufficient to operate and hold the armature 74 in its energized position at which it not only completes the magnetic circuit but also bridges the gap between the conductors 63 and 64 to complete a conducting system which bypasses the rectifier 100.

In the embodiments heretofore described, the armature is illustrated as being normally biased to its non-operating position by means of a spring.

Although special precautions are taken in the design of this spring to provide as nearly a floating armature as is possible, it would be desirable to not only provide a substantially massless armature so as to permit high speed operation thereof as required with as little inertia overcome as is possible but also to achieve instantaneous action of the armature.

Figure 4:
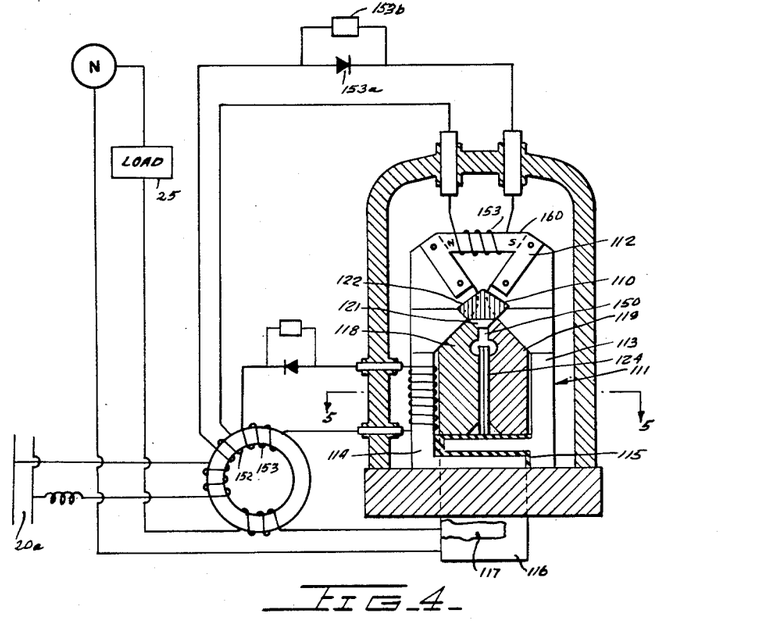
Figure 4 is a side cross-sectional view of another embodiment of my invention illustrating structural arrangement for biasing the contact armature to disengaged position by means of a biassing coil. This figure is a view taken in the direction of the arrows 4—4 of Figure 5.
Figure 5:
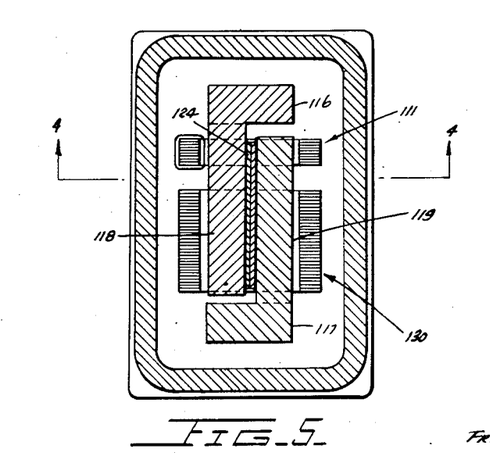
Figure 5 is a view taken along the line 5—5 of Figure 4.

In Figures 4, 5 and 6, I have illustrated an embodiment of my invention in which the armature is operated to its back or de-energized position by an electromagnet and an electromagnetic circuit which replaces the operation of the biasing spring.

As referred to in Figure 4, the armature 110 is operated between its operating position and non-operating position by two electromagnetic systems 111 and 112 respectively.

Electromagnetic circuit 111 comprises core members 113 and 114 separated by insulation 115. This electromagnet 111 is energized by a single turn conductor extending from the source to the load and comprising the conductor bars 116 and 117. Conductor 116 is provided with an integral extension 118 and conductor 117 is provided on integral extension 119.

Extensions 118 and 119 have current carrying contacts thereon which are bridged by the contacts 121 mounted on the armature 122 when the latter is moved to its energized position.

Conductors 116 and 117 are connected through the rectifier 124 of any well known construction.

A second magnetic circuit 130, illustrated in Figures 5 and 6, encloses the conductors 116 and 117. An impulse winding 131, energized in the manner described in detail in connection with impulse winding 22 of Figure 1, is mounted on the first mentioned electromagnetic system 111.

The magnetic loop circuit 112 comprises two downwardly extending legs connected by a permanent magnet 160. The permanent magnet functions to hold the armatures 122 and 122a in the contact disengaged position during the non-conducting half cycle between time $t_4$ and $t$. It will be noted that at time $t_1$—$t_2$ a voltage will be induced in the winding 152 to thereby energize the winding 153 through the resistor 153b. The magnetic field thus created by the ampere-turns of winding 153 will oppose the magnetic field of the permanent magnet 160 and thus even without an impulse winding 131 or attracting force due to single turn winding 118—119 the armature 122 would be pulled downward by the force of gravity to bridge magnetic system 111 and electrical system 118—119. It will be further noted that at the end of the cycle between time $t_2$—$t_4$ the voltage induced in winding 152 will energize winding 153 so that its magnetic field will aid the permanent magnet 160 and thereby attract the armatures 122 and 122a to their disengaged position. At time $t_4$ the winding 153 is no longer energized and thus the armatures 122 and 122a are held in their disengaged position by means of the force from the permanent magnet 160.

As described in connection with Figure 1, at the beginning of the cycle, the voltage pulse induced will generate a current which will flow through the impulse winding 131 sufficiently to operate the armature to its contact engagement.

In the present embodiment, two armatures are provided, one for each of the magnetic systems. One armature 122 is operated by a first magnetic system 111 and the second main armature 122a is operated by the magnetic structure 130.

As will hereinafter be more fully described, the auxiliary armature 122 is first attracted to contact engagement position and then, as the lead current builds up, the main current carrying armature 122a is subsequently attracted to contact engaged position by the magnetic structure 130.

The operation of the apparatus seen in Figures 4, 5 and 6 is as follows:

As the voltage from the source 130 $V_{23}$ starts to increase in a positive direction, as seen in Figure 7, the rectifier 124 will begin to conduct. Conduction of the dry rectifier 124 will permit load current to flow from the source 130 through the electrical system 116, 118, 124, 119, 117, to thereby complete a single loop through the magnetic structure 130—111.

The impulse winding 131 will be energized in a manner heretofore noted and attract the first auxiliary armature 122 into contact engagement. Attraction of the auxiliary armature 122 will permit its integrally attached conducting surface 121 to bridge the gap 150 located between the conductors 118 and 119.

The resulting gradual increase in current flow through the electrical circuit 118, 121, 119, increases the energization of the main magnetic system 130 and thus, its associated main armature 122a will be attracted to engaged position to thereby carry the full load current. The auxiliary armature 122 and the main armature 122a will remain in engaged position at least until the time T3, as seen in Figure 7. At time T3 when the load current $I_{25}$ begins to approach zero value, main armature 122a is only loosely resting on the conducting members 118, 119.

The impulse winding voltage induced in winding 152 will sufficiently energize the biasing coil 153 to attract main armature 122a to disengaged position. After the main armature has interrupted the magnetic and electrical circuit at magnetic means 130, impulse voltage induced in winding 153 will energize the impulse winding 131 in reverse direction from its energization between times T1 and T2. The resulting flux due to this energization will oppose the flux created by the biasing winding 153 and thereby permit this latter winding to attract the auxiliary armature 122 to disengaged position, that is, the counter-impulse voltage in winding 131 is generated in a manner such as that disclosed in connection with Figure 1.

During the non-conducting half cycle from T4 to T5 the auxiliary armature 122 and the main armature 122a are held in disengaged position by the magnitude attracting force created by the permanent magnet 160.

Thus, it is apparent that with this embodiment it is possible to dispense with the necessity for additional energy which ordinarily would be expended in order to counteract the effects of an opening spring when the electromagnetic device is switched to the conducting position.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An electromagnetic switch comprised of a magnetic structure, an armature, and a conductor; said conductor being comprised of a first and a second member positioned in alignment and spaced a predetermined distance from each other; said magnetic structure surrounding said first and second member; said magnetic structure having an air gap in alignment with the space between said first and second member; an armature comprised of a magnetic portion and a conducting portion; said armature positioned in alignment with the gap of said magnetic structure and a space between said first and second member; said armature having an engaged and disengaged position; said magnetic portion of said armature bridging the gap of said magnetic structure when said armature is in said engaged position; said conducting portion of said armature bridging the space between said first and second member when said armature is in said engaged position.

2. An electromagnetic switch comprised of a magnetic structure, an armature, and a conductor; said conductor being comprised of a first and second member positioned in alignment and spaced a predetermined distance from each other; said magnetic structure surrounding said first and second member; said magnetic structure having an air gap in alignment with the space between said first and second member; an armature comprised of a magnetic portion and a conducting portion; said armature positioned in alignment with the gap of said magnetic structure and a space between said first and second member; said armature having an engaged and disengaged position; said magnetic portion of said armature bridging the gap of said magnetic structure when said armature is in said engaged position; said conducting portion of said armature bridging the space between said first and second member when said armature is in said engaged position; said magnetic structure, said armature, and said first and second member housed within a gas filled container with said first and second member extending therethrough.

3. An electromagnetic rectifier for energizing the D.-C. load from an A.-C. source; said electromagnetic rectifier including an electromagnetic switch and a rectifier; said electromagnetic switch comprised of a magnetic structure, an armature, and a conductor; said conductor being comprised of a first and a second member positioned in alignment and spaced a preedtermined distance from each other; said magnetic structure surrounding said first and second member; said magnetic structure having an air gap in alignment with the space between said first and second member; an armature comprised of a magnetic portion and a conducting portion; said armature positioned in alignment with the gap of said magnetic structure and a space between said first and second member; said armature having an engaged and disengaged position; said magnetic portion of said armature bridging the gap of said magnetic structure when said armature is in said engaged position; said conducting portion of said armature bridging the space between said first and second member when said armature is in said engaged position; said A.-C. source, D.-C. load, first member and second member being connected in series; said rectifier being connected across said first and second members; said magnetic structure, said armature, said rectifier, and said first and second member housed within a gas filled container with said first and second member extending therethrough.

4. In an electromagnetic switch comprised of a first and second conductor, a first and second magnetic structure, and a first and second armature; said first and second conductor being in spaced relation with respect to each other to thereby form an air gap therebetween; said first and second magnetic structure each having an air gap; said first and second armature each having a magnetic portion and a conducting portion; said first armature being in alignment with the air gap of said first magnetic structure and the air gap of said first and second conductor; said second armature being in alignment with the air gap of said second magnetic structure and the air gap between said first and second conductor; said first and second conductor forming a single turn control winding for said first and second magnetic structures; said first and second armature having an engaged and disengaged position with respect to said first and second magnetic structures and said conductors; means to move said first armature into engaged position with respect to said first magnetic structure and said first and second conductor; said first and second conductor effective to move said second armature into engaged position after said first armature has been moved to said engaged position.

5. In an electromagetic apparatus comprised of a first and second conductor, a first and second magnetic structure, and a first and second armature; said first and second conductor being in spaced relation with respect to each other to thereby form an air gap therebetween; said first and second magnetic structure each having an air gap; said first and second armature each having a magnetic portion and a conducting portion; said first armature being in alignment with the air gap of said first magnetic structure and the air gap of said first and second conductor; said second armature being in alignment with the air gap of said second magnetic structure and the air gap between said first and second conductor; said first and second conductor forming a single turn control winding for said first and second magnetic structures; said first and second armature having an engaged and disengaged position with respect to said first and second magnetic structures respectively and said conductors; means to move said first armature into engaged position with respect to said first magnetic structure and said first and second conductor; said first and second conductor effective to move said second armature into engaged position after said first armature has been moved to said engaged position; electromagnetic means to move said first and second armature to said disengaged position.

6. In an electromagnetic rectifier for energizing a D. C. load from an A. C. source; said electromagnetic rectifier including an electromagnetic switch and a rectifier; said electromagnetic switch comprised of a first and second conductor, a first and second magnetic structure, and a first and second armature; said first and second conductor being in spaced relation with respect to each other to thereby form an air gap therebetween; said first and second magnetic structure each having an air gap; said first and second armature each having a magnetic portion and a conducting portion; said first armature being in alignment with the air gap of said first magnetic structure and the air gap of said first and second conductor; said second armature being in alignment with the air gap of said second magnetic structure and the air gap between said first and second conductor; said first and second conductor forming a single turn control winding for said first and second magnetic structures; said first and second armature having an engaged and disengaged position with respect to said first and second magnetic structures and said conductors; said A. C. source, D. C. load, first conductor and second conductor connected in series; a rectifier positioned in the air gap between said first and second conductor and electrically connected thereto; means to move said first armature into engaged position with respect to said first magnetic structure and said first and second conductor; said first and second conductor effective to move said second armature into engaged position after said first armature has been moved to said engaged position; electromagnetic means to move said first and second armature to said disengaged position; said first and second magnetic structure, said first and second armature, said first and second conducting members, said rectifier and said electromagnetic means sealed within a gas container.

References Cited in the file of this patent
UNITED STATES PATENTS

| | | |
|---|---|---|
| 1,220,813 | Barrow | Mar. 27, 1917 |
| 1,265,354 | Mershon | May 7, 1918 |
| 1,298,727 | Jackson | Apr. 1, 1919 |
| 1,783,279 | Burnham | Dec. 2, 1930 |
| 1,834,447 | Dicke | Dec. 1, 1931 |
| 1,934,467 | Hopp | Nov. 7, 1933 |

FOREIGN PATENTS

| | | |
|---|---|---|
| 613,540 | Great Britain | Nov. 20, 1948 |
| 865,079 | France | May 13, 1941 |
| 905,953 | France | Dec. 19, 1945 |
| 264,109 | Switzerland | Dec. 16, 1949 |